United States Patent
Ji et al.

(10) Patent No.: US 12,184,216 B2
(45) Date of Patent: Dec. 31, 2024

(54) PARAMETER CONTROL SYSTEM AND MOTOR INCLUDING THE PARAMETER CONTROL SYSTEM

(71) Applicant: Danfoss (Tianjin) Ltd., Tianjin (CN)

(72) Inventors: Shizhong Ji, Tianjin (CN); Li Yao, Tianjin (CN); Yingke Sun, Tianjin (CN); Qingyue Meng, Tianjin (CN)

(73) Assignee: DANFOSS (TIANJIN) LTD., Tianjin (CN)

( * ) Notice: Subject to any disclaimer, the term of this patent is extended or adjusted under 35 U.S.C. 154(b) by 18 days.

(21) Appl. No.: 16/942,105

(22) Filed: Jul. 29, 2020

(65) Prior Publication Data
US 2021/0036651 A1  Feb. 4, 2021

(30) Foreign Application Priority Data

Jul. 30, 2019 (CN) .......................... 201921230190.0

(51) Int. Cl.
*H02P 29/60* (2016.01)
(52) U.S. Cl.
CPC .................................... *H02P 29/60* (2016.02)
(58) Field of Classification Search
CPC ...................................................... H02P 29/60
USPC ........................................................ 318/445
See application file for complete search history.

(56) References Cited

U.S. PATENT DOCUMENTS

| | | | | |
|---|---|---|---|---|
| 7,576,504 B2 * | 8/2009 | Mullet | ..................... | E05F 15/41 318/445 |
| 9,744,951 B2 * | 8/2017 | Sussek | ..................... | B60T 8/172 |
| 2007/0007945 A1 * | 1/2007 | King | ..................... | G01R 21/133 324/76.77 |
| 2015/0097502 A1 | 4/2015 | Wiik et al. | | |
| 2015/0194914 A1 * | 7/2015 | Katariya | ............. | H02P 21/0003 318/400.04 |
| 2016/0079757 A1 * | 3/2016 | Matan | ..................... | G01R 11/54 307/24 |

(Continued)

FOREIGN PATENT DOCUMENTS

| BR | PI0107381 B1 * | 9/2016 |
|---|---|---|
| CN | 103427758 A | 12/2013 |

(Continued)

OTHER PUBLICATIONS

Inyoung Hwang and Joonhyung Park (KR 100374842 B1) Driving Control Method of Refrigerator Using Reciprocating Compressor Date Published Mar. 4, 2003 (Year: 2003).*

(Continued)

*Primary Examiner* — Jorge L Carrasquillo
(74) *Attorney, Agent, or Firm* — McCormick, Paulding & Huber PLLC

(57) ABSTRACT

The present disclosure provides a parameter control system for a motor, comprising: a current acquisition circuit connected to the motor, so as to acquire a current output by the motor; an arithmetic processor configured to determine whether to adjust a parameter of the motor according to the current acquired, and generate a new parameter when it is determined to adjust the parameter of the motor; and an output circuit configured to output the new parameter generated by the arithmetic processor to a control device of the motor. The present disclosure also provides a motor including the parameter control system.

15 Claims, 6 Drawing Sheets

(56) References Cited

U.S. PATENT DOCUMENTS

2018/0309396 A1* 10/2018 Hardt ............... H02P 27/08

FOREIGN PATENT DOCUMENTS

| CN | 108696213 A | 10/2018 | |
|---|---|---|---|
| DE | 102018127247 A1 * | 5/2019 | ......... G01R 31/2829 |

OTHER PUBLICATIONS

Koch et al. (DE 10326785 B4) Method and Control Circuit for Setting a Blocking Recognition for a Fan Motor Date Published Mar. 8, 2018 (Year: 2018).*

Filgueiras Alexandre (BR PI0107381 B1).Process for Monitoring and Controlling an Electric Motor Date Published Sep. 6, 2016 (Year: 2016).*

* cited by examiner $$\beta = \cos^{-1} \frac{-\Psi_r + \sqrt{\Psi_r^2 + 8(L_d - L_q)^2 I_s^2}}{4(L_d - L_q)I_s}$$

MTPA

FIG. 4(c)

PARAMETER CONTROL SYSTEM AND MOTOR INCLUDING THE PARAMETER CONTROL SYSTEM

CROSS-REFERENCE TO RELATED APPLICATION

This application claims foreign priority benefits under 35 U.S.C. § 119 to Chinese Patent Application No. 201921230190.0 filed on Jul. 30, 2019, the content of which is hereby incorporated by reference in its entirety.

TECHNICAL FIELD

The present disclosure relates to the field of power electric technology, and more particularly, to a parameter control system for a motor and the motor including the parameter control system.

BACKGROUND

During an operation of a motor, many motor parameters are applied for a control module such as a flux detector, MTPA, feedforward decoupling, MTPV, etc.

The motor generates heat during the operation, and the heat will cause the motor's parameters such as a resistance and an inductance to change. The control accuracy of a frequency converter of the motor depends on the motor's parameters significantly. The change of the parameters will lead to a decrease of the control accuracy (such as the decrease of the accuracy for observing a rotor angle, an inaccuracy of the MTPA algorithm, a change of the mathematical model for the motor, etc.), and thereby the output current continues to increase, aggravating the heating generation of the motor, and falling into a vicious loop.

To suppress this vicious loop, commonly used solutions are to limit the current output capacity of the frequency converter or to perform a physical cooling for the motor.

With respect to the solution of limiting the current output capacity of the frequency converter, it may make the frequency converter unable to output its rated power.

With respect to the solution of performing the physical cooling, it cannot guarantee a constant temperature and will increase costs.

SUMMARY

In order to solve the above technical problem at least in part, embodiments of the present disclosure proposes a parameter control system for a motor, which automatically corrects a parameter, enables the motor parameter to automatically track temperature changes, thereby improving the control accuracy, stabilizing the output current, and not deteriorating the heat generation.

A first aspect of the present disclosure provides a parameter control system for a motor. The system includes a current acquisition circuit connected to the motor, configured to acquire a current output by the motor; an arithmetic processor configured to determine whether to adjust a parameter of the motor according to the current acquired, and to generate a new parameter when it is determined to adjust the parameter of the motor; and an output circuit configured to output the new parameter generated by the arithmetic processor to a control device of the motor.

According to an exemplary embodiment, the arithmetic processor is configured to: compare the current acquired with a previous acquired current; and determine not to adjust the parameter of the motor if a difference between the current acquired and the previous acquired current does not exceed a threshold.

According to an exemplary embodiment, the arithmetic processor is configured to: compare the current acquired with a previous acquired current; and subtract a control step of the parameter of the motor from the parameter to generate the new parameter if the current acquired is greater than the previous acquired current and a difference between the current acquired and the previous acquired current exceeds a threshold.

According to an exemplary embodiment, the arithmetic processor is configured to: compare the current acquired with a previous acquired current; and add a control step of the parameter of the motor to the parameter to generate the new parameter if the current acquired is less than the previous acquired current and a difference between the previous acquired current and the current acquired exceeds a threshold.

According to an exemplary embodiment, the threshold is predetermined.

According to an exemplary embodiment, the control step is predetermined.

According to an exemplary embodiment, the control device of the motor includes at least one of: a Maximum Torque per Ampere (MTPA) controller, a Maximum Torque per Volt (MTPV) controller, a flux observer, and a feedforward decoupling controller.

According to an exemplary embodiment, the current acquisition circuit acquires the current at a predetermined frequency ranging from 1 Hz to 10 Hz.

According to an exemplary embodiment, the parameters of the motor comprise at least one of: a stator resistance, a direct axis-quadrature axis (dq axis) inductance, and a permanent magnetic back EMF.

A second aspect of the present disclosure provides a motor including the parameter control system according to the embodiments of the present disclosure.

BRIEF DESCRIPTION OF THE ACCOMPANYING DRAWINGS

For a more complete understanding of the present disclosure and its advantages, embodiments will be made with reference to the accompanying drawings, in which.

Figure 4A:
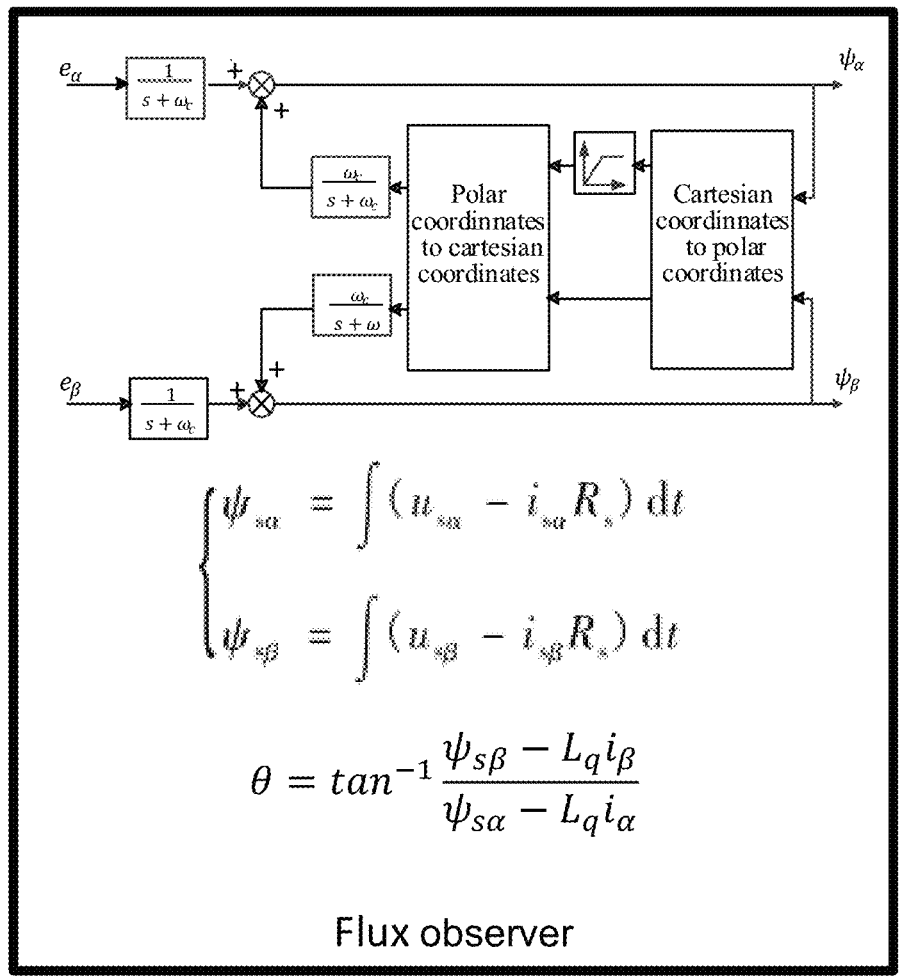
Figure 4B:
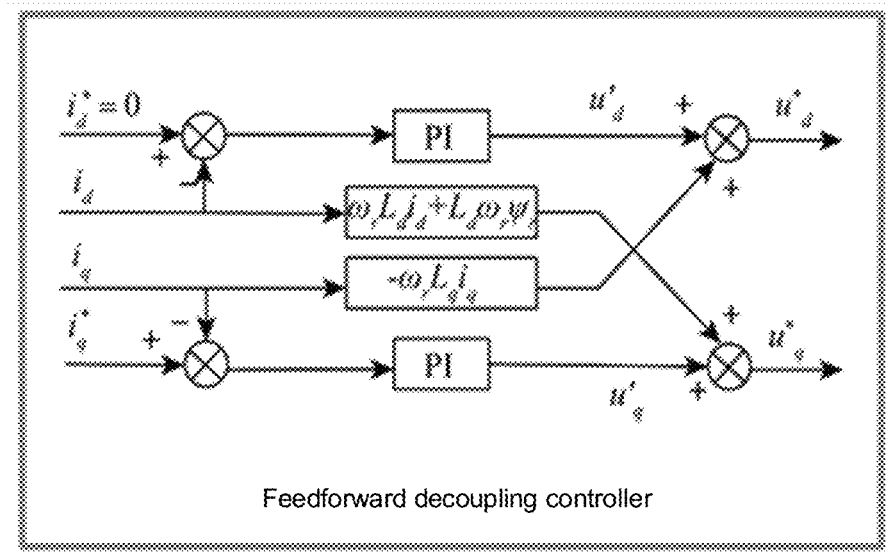
Figure 5:
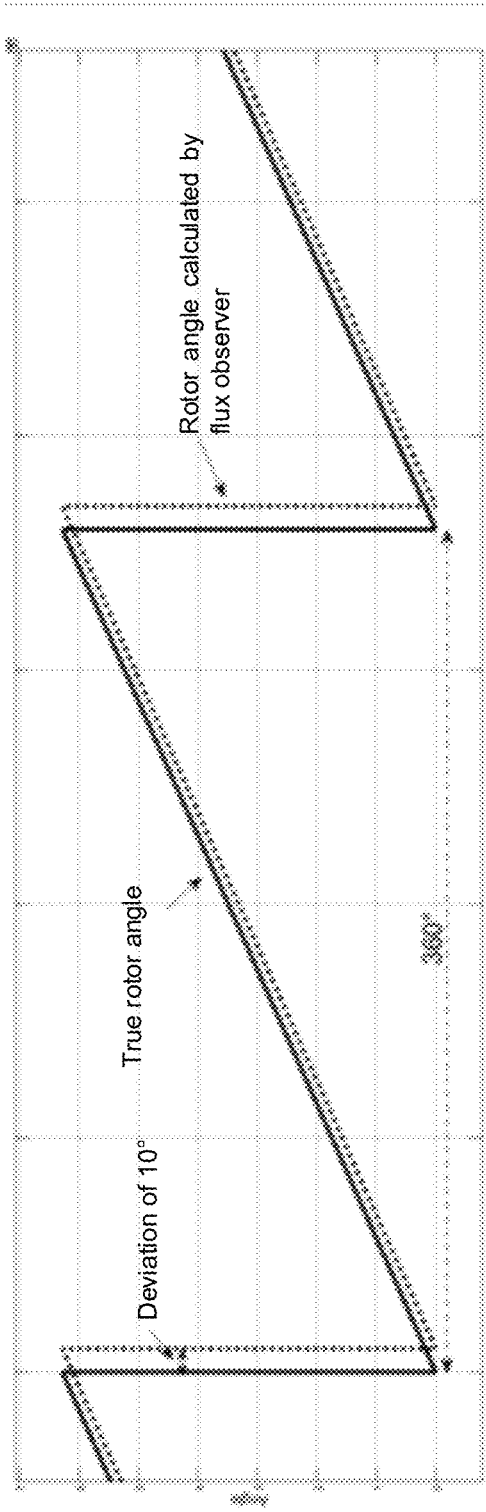
Figure 5:
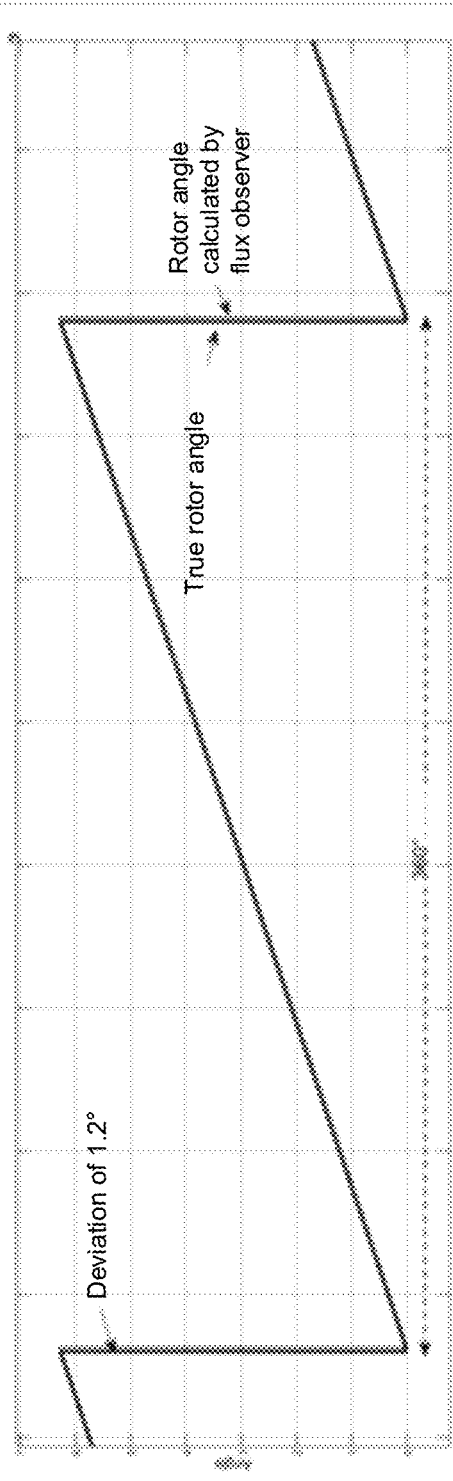
Figure 6:
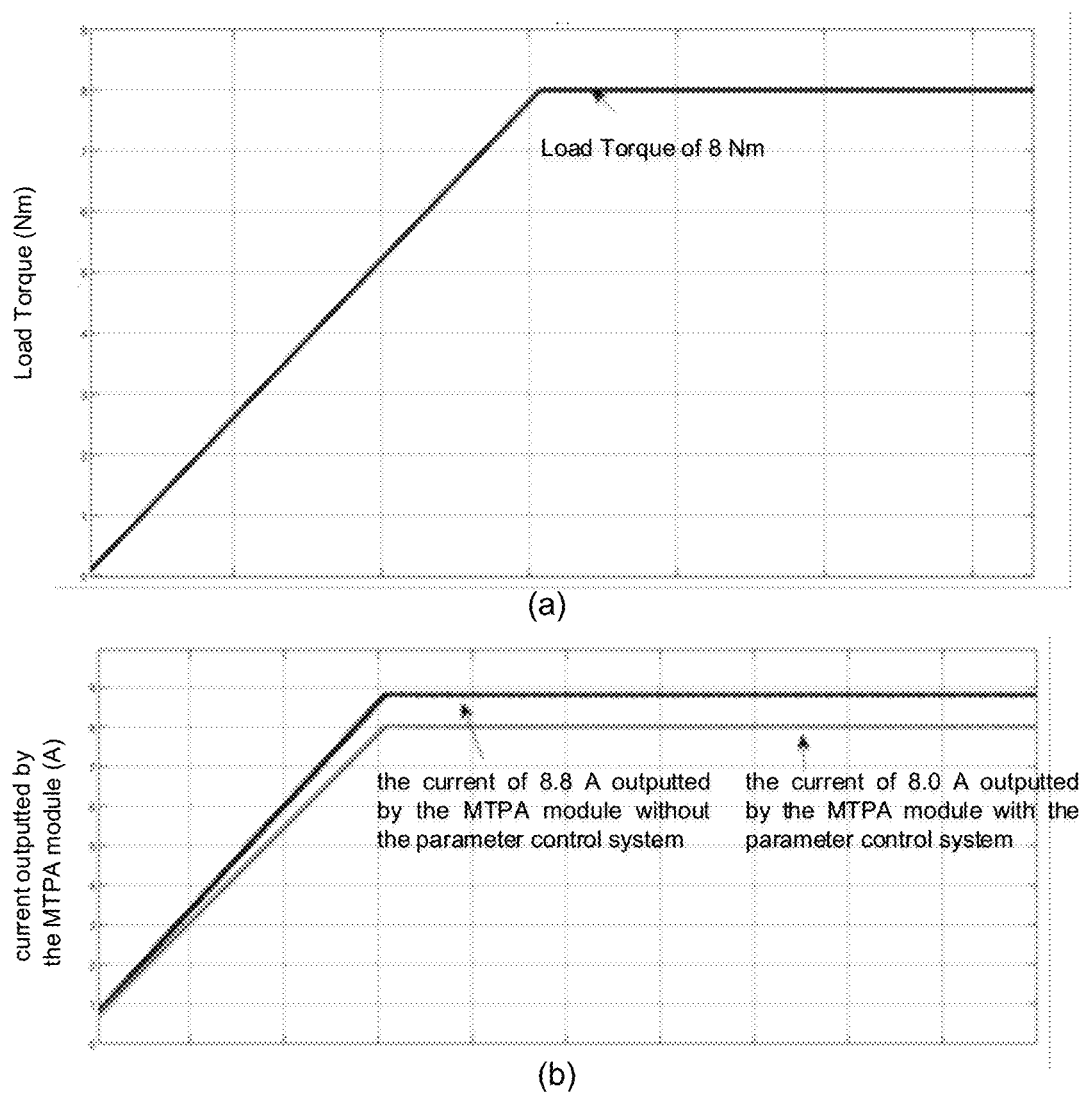

FIG. 4(a), FIG. 4(b) and FIG. 4(c) illustrate schematic model diagrams of a flux observer, a feedforward decoupling controller and a MTPA which the parameter control system according to an embodiment of the present disclosure can be used to control;

FIG. 5 illustrate a comparison of simulation results for rotor angels output by the flux observer without the parameter control system of the present disclosure ((a) of FIG. 5) and the flux observer with the parameter control system of the present disclosure (see (b) of FIG. 5); and FIG. 6 illustrates a comparison of simulation results for current values output by the MTPA without the parameter control system of the present disclosure and the MTPA with the parameter control system of the present disclosure under the same load torque.

DETAILED DESCRIPTION

Hereinafter, embodiments of the present disclosure will be described with reference to the accompanying drawings. It should be understood, however, that these descriptions are merely exemplary and are not intended to limit the scope of the present disclosure. In addition, in the following description, description of well-known structures and technologies is omitted to avoid unnecessarily obscuring the concepts of the present disclosure.

The terminology used herein is for the purpose of describing specific embodiments only and is not intended to limit the disclosure. The words "a", "an" and "the" as used herein should also include the meaning of "plurality" and "multiple" unless the context clearly indicates otherwise. In addition, the terms "including", "comprising" and the like indicate the presence of features, steps, operations, and/or components, but do not exclude the presence or addition of one or more other features, steps, operations, or components.

All terms (including technical and scientific terms) used herein have the meaning commonly understood by those skilled in the art unless otherwise defined. It should be noted that the terms used herein should be interpreted to have meanings consistent with the context of the description, and should not be interpreted in an idealized or overly rigid manner.

Some block diagrams and/or flowcharts are shown in the accompanying drawings. It should be understood that some of the blocks in the block diagrams and/or flowcharts or combinations thereof may be implemented by computer program instructions. These computer program instructions may be provided to the processor of a general-purpose computer, a special-purpose computer, or other programmable data processing device, so that when executed by the processor, these instructions may create devices for implementing the functions/operations described in these block diagrams and/or flowcharts.

Figure 1:
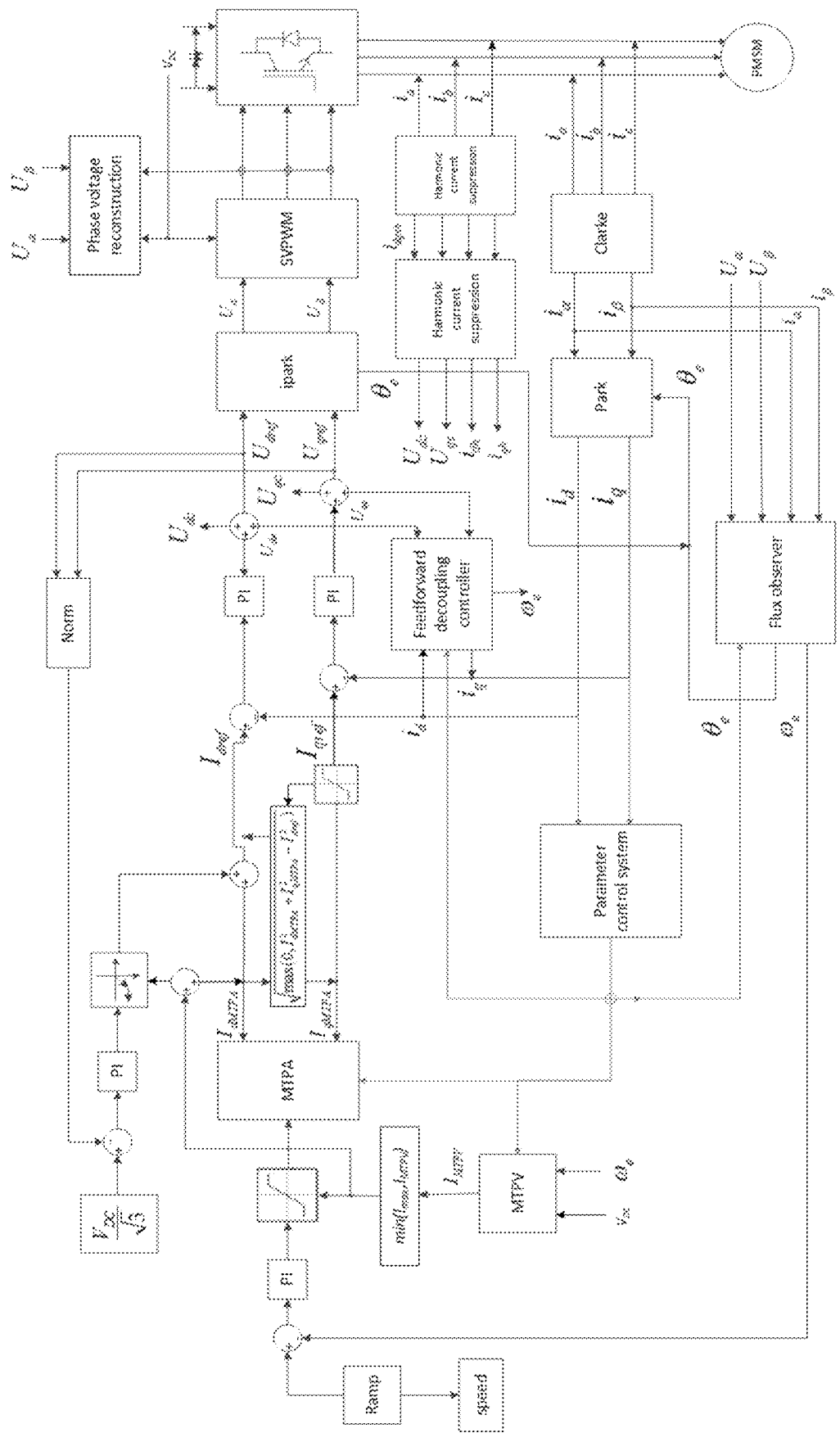
FIG. 1 illustrates a schematic diagram of a relationship between a parameter control system for a motor and the motor according to an embodiment of the present disclosure.

FIG. 1 illustrates a schematic diagram of a relationship between a parameter control system for a motor and the motor according to an embodiment of the present disclosure.

As shown in FIG. 1, the parameter control system according to the embodiment of the present disclosure is configured to acquire a current of the motor, and capable of controlling a control device in the motor, such as a Maximum Torque per Ampere (MTPA) controller, a Maximum Torque per Volt (MTPV) controller, a flux observer, a feedforward decoupling controller, etc. Specifically, the parameter control system according to the embodiment of the present disclosure may control the motor parameters used in the control device, so that the motor parameters can automatically track temperature changes, thereby improving the control accuracy for the motor parameter and making the output current more stable. The motor parameters comprise at least one of: a stator resistance, a direct axis-quadrature axis (dq axis) inductance, and a permanent magnetic back EMF.

Figure 2:
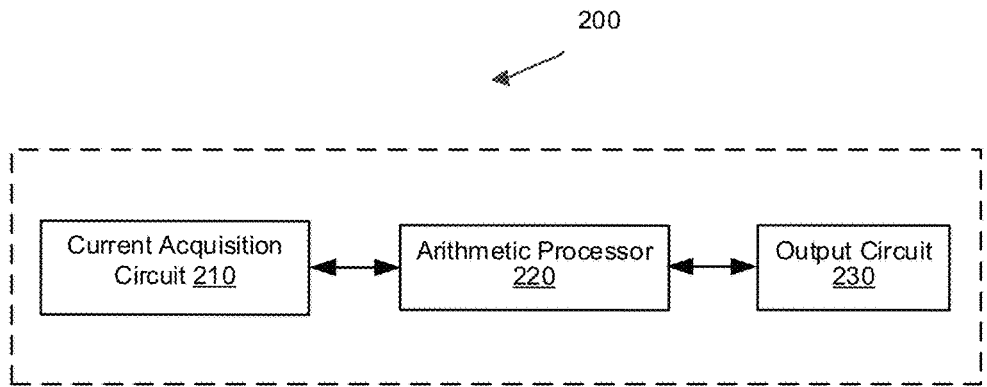
FIG. 2 illustrates a schematic structural diagram of the parameter control system according to an embodiment of the present disclosure.

FIG. 2 illustrates a schematic structural diagram of the parameter control system 200 according to an embodiment of the present disclosure.

As shown in FIG. 2, the parameter control system 200 for the motor according to an embodiment of the present disclosure includes: a current acquisition circuit 210 connected to the motor, so as to acquire a current output by the motor; an arithmetic processor 220 configured to determine whether to adjust a parameter of the motor according to the current acquired, and generate a new parameter when it is determined to adjust the parameter of the motor; and an output circuit 230 configured to output the new parameter generated by the arithmetic processor 220 to the control device of the motor mentioned above.

According to an embodiment of the present disclosure, the current acquisition circuit 210 may be connected to a current detection circuit (e.g., a current sensor, etc.) of the motor, so as to acquire the current output by the motor. According to an exemplary embodiment, the current acquisition circuit 210 may be implemented as, for example, a Hall current sensor, a sample resistor, or the like. The arithmetic processor 220 may be any processor, including one or more general-purpose or special-purpose processors (e.g., a microprocessor, a digital signal processor, a custom processor, and a field programable gate array (FPGA)). The output circuit 230 may be connected to the control device of the motor mentioned above, so as to output a new parameter to these control devices.

According to an exemplary embodiment, the arithmetic processor 220 is configured to: compare the current acquired with a previous acquired current; and determine not to adjust the parameter of the motor if a difference between the current acquired and the previous acquired current does not exceed a threshold.

According to another exemplary embodiment, the arithmetic processor 220 is configured to: compare the current acquired with a previous acquired current; if the current acquired is greater than the previous acquired current and a difference between the current acquired and the previous acquired current exceeds a threshold, subtract a control step of a parameter of the motor from the parameter, so as to generate a new parameter.

According to another exemplary embodiment, the arithmetic processor 220 is configured to: compare the current acquired with a previous acquired current; if the current acquired is less than the previous acquired current and a difference between the previous acquired current and the current acquired exceeds a threshold, add a control step of a parameter of the motor to the parameter, so as to generate a new parameter.

Figure 3:
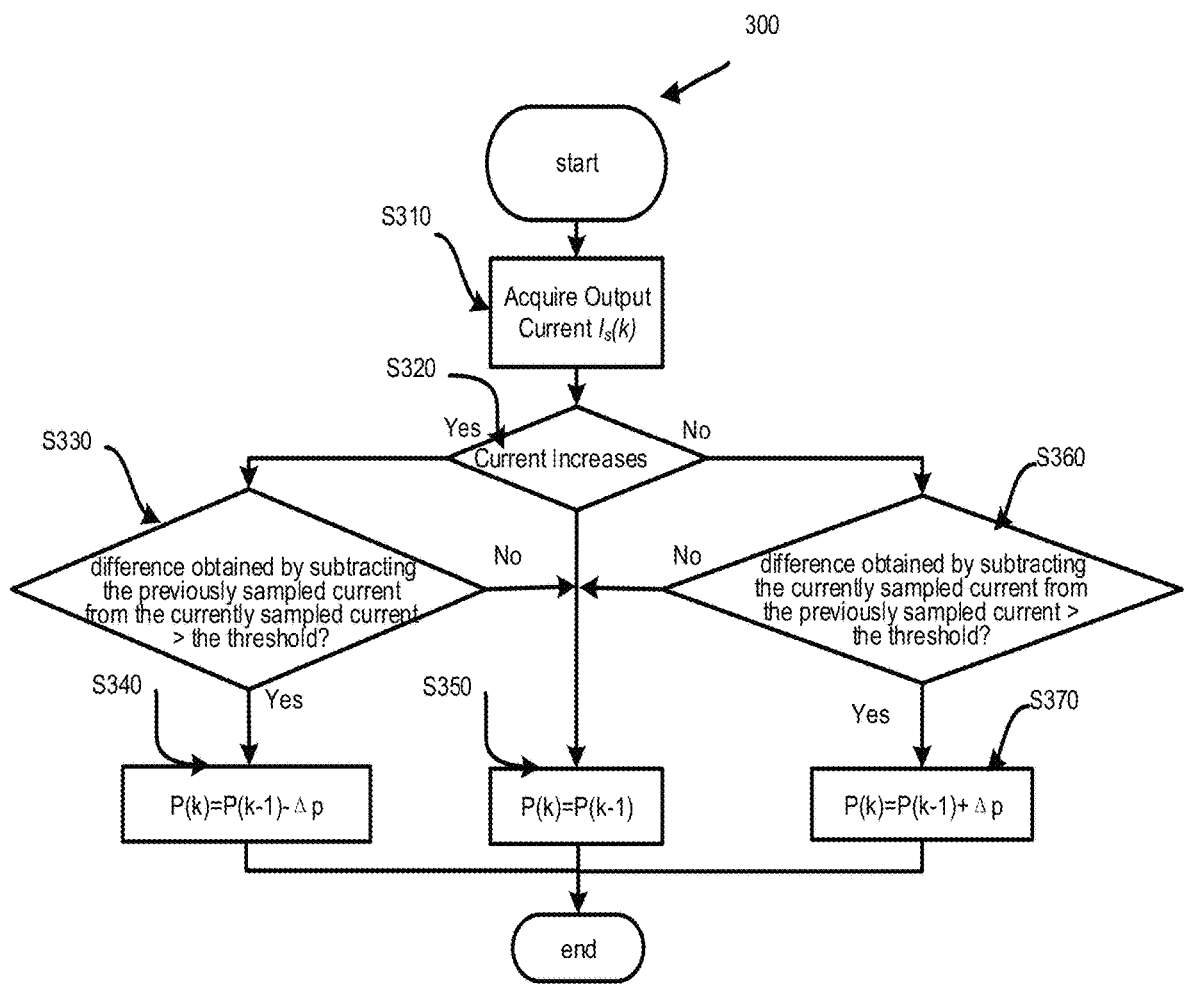
FIG. 3 illustrates a flowchart of a parameter control method according to an embodiment of the present disclosure.

FIG. 3 illustrates a flowchart of a parameter control method 300 according to an embodiment of the present disclosure.

As shown in FIG. 3, in the parameter control method 300 according to the embodiment of the present disclosure, in step S310, the current $I_s(k)$ output by the motor is acquired. In step S320, the current acquired is compared with a previous acquired current, so as to determine whether the current increases or not. If the current acquired is identical with the previous acquired current, it is determined in step S350 not to adjust the parameters of the motor. That is, the initial parameter will be used, i.e., $P(k)=P(k-1)$. If the current acquired is greater than the previous acquired current, it is determined in step S330 whether a difference between the current acquired and the previous acquired current exceeds a predetermined threshold. If it is determined in step S330 that the difference between the current acquired and the previous acquired current exceeds the predetermined threshold, a control step $\Delta p$ of the parameter of the motor is subtracted from the parameter in step S340, so as to generate the new parameter, i.e., $P(k)=P(k-1)-\Delta p$. If it is determined in step S330 that the difference between the current acquired and the previous acquired current does not exceed the predetermined threshold, it is determined in step S350 not to adjust the parameter of the motor, that is, the initial parameter is used. If it is determined in step S320 that the current acquired is less than the previous acquired current, it is determined in step S360 whether a difference between the previous acquired current and the current acquired exceeds the threshold or not. If it is determined in step S360 that the difference between the previous acquired current and the current acquired exceeds the threshold, the method proceeds to step S370, in which the control step Δp of the parameter of the motor is added to the parameter, so as to generate the new parameter, i.e., P(k)=P(k−1)+Δp. If it is determined in step S360 that the difference between the previous acquired current and the current acquired does not exceed the predetermined threshold, the method proceeds to step S350, in which it is determined not to adjust the parameter of the motor. That is, the initial parameter will be used. According to an exemplary embodiment, the threshold is predetermined. If the control tolerance for the motor is set to be large, the threshold may be set to a large value. If an accurate control of the motor is required, the threshold may be set to a small value. The appropriate threshold may be set according to actual needs. For example, for the motor with the rated current of 100 A, the threshold may be set to 5 A.

According to an exemplary embodiment, the control step of a motor parameter is predetermined. For example, for the stator resistance, the control step can be set so that it is adjusted by 1 ohm at a time. For the direct axis-quadrature axis (dq axis) inductance, the control step can be set so that it is adjusted by 1 Henry (H) at a time. For the permanent magnetic back EMF, the control step can be set so that it is adjusted by 1 volt (V) at a time. According to another exemplary embodiment, the control step may be set to a relative value, for example 1%. For example, for a stator resistance of 350 milliohms, the control step can be set to 3.5 milliohms per adjustment, and for a stator resistance of 100 milliohms, the control step can be set to 1 milliohm per adjustment.

According to an exemplary embodiment, the control step may be changed according to the difference between the current acquired and a reference current. The reference current is a preset current output by the motor under an ideal condition. For example, the control step may increase with an increase of the difference between the acquired current acquired and the reference current, or may decrease with a decrease of the difference between the acquired current and the reference current. For example, for the motor with the rated current of 100 A, when the difference between the acquired current and the reference current is greater than 4 A, the control step for the stator resistance may be set to 2 ohms, and when the difference between the acquired current and the reference current is less than 4 A, the control step for the stator resistance may be set to 1 ohm. In this way, when the current output from the motor deviates from the reference current by a large amount, the parameter of the motor can be adjusted back to the reference value as soon as possible, while when the current output from the motor deviates from the reference current by a small amount, that is, when the motor is operating in an acceptable tolerance range, the parameter of the motor can be adjusted in a smaller control step.

According to an exemplary embodiment, the control device of the motor include at least one of: a Maximum Torque per Ampere (MTPA) controller, a Maximum Torque per Volt (MTPV) controller, a flux observer, and a feedforward decoupling controller.

As shown in FIG. 1, the parameter control system according to the embodiment of the present disclosure may be used to control a control device in the motor, for example, a Maximum Torque per Ampere (MTPA) controller, a Maximum Torque per Volt (MTPV) controller, a flux observer, and a feedforward decoupling controller.

Normally, the frequency converter of the motor samples the current at a switching frequency, for example, perform the sampling once at about 2 kHz-10 kHz, so as to supply the sampled current to the control system or a control device of the motor. However, the parameter control system according to the embodiment of the present disclosure may not need to acquire the current and adjust the parameter of the motor so frequently. According to an exemplary embodiment, the current acquisition circuit 210 according to the present disclosure can detect and acquire the current at a predetermined lower frequency, for example, the predetermined frequency ranges from 1 Hz to 10 Hz.

FIG. 4(a), FIG. 4(b) and FIG. 4(c) illustrate schematic model diagrams of a flux observer, a feedforward decoupling controller and a MTPA which the parameter control system according to the embodiment of the present disclosure can be used to control. FIG. 4(a), FIG. 4(b) and FIG. 4(c) illustrate some parameters of the motor that are required to be monitored and adjusted in blocks. In FIG. 4(a), FIG. 4(b) and FIG. 4(c):

$U_{s\alpha}$, $U_{s\beta}$ are α-axis and β-axis voltage components in the αβ coordinate system;

$i_{s\alpha}$, $i_{s\beta}$ are α-axis and β-axis current components in the αβ coordinate system;

$\Psi_{s\alpha}$, $\Psi_{s\beta}$ are α-axis and β-axis flux linkages in the αβ static coordinate system;

$i_d$, $i_q$ are the d/q-axis current;

$U_d$, $U_q$ are the d/q-axis voltage;

$\Psi_r$ is permanent magnetic back EMF coefficient, $L_d$, $L_q$ are the d/q-axis inductance;

β is a lead angle of the current vector leading back EMF, $\omega_r$ is a rotor angular frequency;

$d_t$ is a differential of time;

$R_s$ is a stator resistance;

$e_\alpha$, $e_\beta$ are back EMF components of the α-axis and β-axis in the αβ coordinate system;

$w_c$ is a cut-off frequency of a low-pass filter;

S is an intermediate variable in mathematical operation and has no practical meaning;

$i_{s\alpha}$, $i_{s\beta}$ are α-axis and β-axis current components in the αβ coordinate system;

$R_s$ is a stator resistance;

PI is the abbreviation of Proportion Integral regulator;

$\Psi_r$ is permanent magnetic back EMF coefficient;

$i_s$ is a stator current.

From the formula shown in FIG. 4(a), we can see that the direct axis-quadrature axis (dq axis) inductance Lq directly affects a calculated value of the rotor angle. The accuracy of the rotor angle is the key point of the Field-Oriented Control (FOC) algorithm, which directly affects the current decoupling of the motor, and ultimately affects the operating current value of the motor. The greater the deviation between the calculated value of the rotor angle and the true angle is, the greater the current will be, and the increase of the current ultimately affects the operation map of the compressor. As can be seen from the formula shown in FIG. 4(c), the values of Lq and Ld may affect the calculated value of the lead angle β.

As can be seen from FIG. 4(a), FIG. 4(b) and FIG. 4(c), the stator resistance need be controlled accurately in the flux observer, and the direct axis-quadrature axis (dq axis) inductance need be controlled accurately in the flux observer, the feedforward decoupling controller and the MTPA, so that the output of the flux observer, the feedforward decoupling controller and the MTPA become accurate.

FIG. 5 illustrate a comparison of simulation results for the rotor positional angels output by the flux observer without the parameter control system of the present disclosure ((a) of FIG. 5) and by the flux observer with the parameter control system of the present disclosure (see (b) of FIG. 5). As shown in FIG. 5(a) and (b), an error between the rotor angle output by the flux observer without the parameter control system of the present disclosure and the true rotor angle is about 10°, while the error between the rotor angle output by the flux observer with the parameter control system of the present disclosure and the true rotor angle is about 1.2°.

FIG. 6 illustrates a comparison of the simulation results for the current values output by the MTPA without the parameter control system of the present disclosure and by the MTPA with the parameter control system of the present disclosure under the same load torque. As shown in FIG. 6, under the same torque (8 Nm) ((a) in FIG. 6), the output current of the MTPA module is 8.0 A in a case that the parameter control system is applied, and the output current of the MTPA module is 8.8 A in a case that no parameter control system is applied. The difference therebetween is 0.8 A ((b) in FIG. 6). If the load is larger, the error will be bigger. This may cause the output current of the frequency converter to reach its current limit in advance, and finally shrink the operation map of the compressor.

The parameter control system according to the present disclosure can adapt to parameter changes in any case. By using the disturbance, it requires no additional models and need not rely on other parameters, and also provides a good real-time performance and a high robustness. The time required for the parameter control system to adjust the parameter to the reference value depends on the threshold and the control step. As can be seen from the simulation results shown in FIG. 5 and FIG. 6, the rotor angle calculated by the flux observer having the parameter control system of the present disclosure has a significant improvement in accuracy and is closer to the true rotor angle of the motor. Meanwhile, a smaller current is output by the flux observer having the parameter control system of the present disclosure under the same load torque. The parameter control system of the present disclosure improves the control effectiveness.

In addition, another embodiment of the present disclosure provides a motor including the parameter control system according to embodiments of the present disclosure. The motor according to the present disclosure has the same features and advantages as the parameter control system according to the above embodiments of the present disclosure, which will not be described here again.

Those skilled in the art may understand that the features recited in the various embodiments and/or claims of the present disclosure may be combined in various ways, even if such combinations are not explicitly described in the present disclosure. In particular, the features recited in the various embodiments and/or claims of the present disclosure may be combined in various ways without departing from the spirit and teachings of the present disclosure. All these combinations fall within the scope of the present disclosure.

Although the present disclosure has been shown and described with reference to specific exemplary embodiments of the present disclosure, those skilled in the art should understand that without departing from the spirit and scope of the present disclosure as defined by the appended claims and their equivalents, various changes in form and details can be made to the present disclosure. Therefore, the scope of the present disclosure should not be limited to the above-described embodiments, but should be determined not only by the appended claims but also by the equivalents of the appended claims.

What is claimed:

1. A parameter control system for a motor used in a compressor with a frequency converter, comprising:
    a current acquisition circuit connected to the motor, configured to acquire a current output by the motor;
    an arithmetic processor configured to determine whether to adjust a parameter of the motor according to a difference between the current acquired and a previous acquired current, and generate a new parameter by adding or subtracting a control step to or from the parameter of the motor when it is determined to adjust the parameter of the motor to improve motor control accuracy; and
    an output circuit configured to output the new parameter generated by the arithmetic processor to a control device of the motor;
    wherein the arithmetic processor is configured to:
        compare the current acquired with a previous acquired current; and
        subtract a control step of the parameter of the motor from the parameter to generate the new parameter if the current acquired is greater than the previous acquired current and a difference between the current acquired and the previous acquired current exceeds a threshold;
        add a control step of the parameter of the motor to the parameter to generate the new parameter if the current acquired is less than the previous acquired current and a difference between the previous acquired current and the current acquired exceeds the threshold.

2. The parameter control system for the motor used in the compressor with the frequency converter according to claim 1, wherein the arithmetic processor is configured to:
    determine not to adjust the parameter of the motor if a difference between the current acquired and the previous acquired current does not exceed the threshold.

3. The parameter control system for the motor used in the compressor with the frequency converter according to claim 2, wherein the threshold is predetermined.

4. The parameter control system for the motor used in the compressor with the frequency converter according to claim 1, wherein the control step is predetermined.

5. The parameter control system for the motor used in the compressor with the frequency converter according to claim 1, wherein the control device of the motor comprises at least one of: a Maximum Torque per Ampere (MTPA) controller, a Maximum Torque per Volt (MTPV) controller, a flux observer, and a feedforward decoupling controller.

6. The parameter control system for the motor used in the compressor with the frequency converter according to claim 1, wherein the current acquisition circuit acquires the current at a predetermined frequency ranging from 1 Hz to 10 Hz.

7. The parameter control system for the motor used in the compressor with the frequency converter according to claim 1, wherein the parameter of the motor comprises at least one of: a stator resistance, a direct axis-quadrature axis (dq axis) inductance, and a permanent magnetic back Electromotive Force (EMF).

8. A motor in a compressor with a frequency converter, comprising a parameter control system according to claim 1.

9. The motor in the compressor with the frequency converter according to claim 8, wherein the arithmetic processor is configured to: determine not to adjust the parameter of the motor if a difference between the current acquired and the previous acquired current does not exceed the threshold.

10. The motor in the compressor with the frequency converter according to claim 9, wherein the threshold is predetermined.

11. The motor in the compressor with the frequency converter according to claim 8, wherein the control step is predetermined.

12. The motor in the compressor with the frequency converter according to claim 8, wherein a control device of the motor comprises at least one of: a Maximum Torque per Ampere (MTPA) controller, a Maximum Torque per Volt (MTPV) controller, a flux observer, and a feedforward decoupling controller.

13. The motor in the compressor with the frequency converter according to claim 8, wherein the current acquisition circuit acquires the current at a predetermined frequency ranging from 1 Hz to 10 Hz.

14. The motor in the compressor with the frequency converter according to claim 8, wherein the parameter of the motor comprises at least one of: a stator resistance, a direct axis-quadrature axis (dq axis) inductance, and a permanent magnetic back Electromotive Force (EMF).

15. The parameter control system for the motor used in the compressor with the frequency converter according to claim 1, wherein the threshold is predetermined.

* * * * *